United States Patent
Chuang

(10) Patent No.: US 9,219,897 B2
(45) Date of Patent: Dec. 22, 2015

(54) IMAGE SENSING APPARATUS AND COLOR-CORRECTION MATRIX CORRECTING METHOD AND LOOK-UP TABLE ESTABLISHING METHOD

(71) Applicant: Faraday Technology Corp., Hsin-Chu (TW)

(72) Inventor: Hung-Chang Chuang, Kaohsiung (TW)

(73) Assignee: Faraday Technology Corp., Science-Based Industrial Park, Hsin-Chu (TW)

(*) Notice: Subject to any disclaimer, the term of this patent is extended or adjusted under 35 U.S.C. 154(b) by 0 days.

(21) Appl. No.: 14/276,974

(22) Filed: May 13, 2014

(65) Prior Publication Data

US 2015/0271459 A1    Sep. 24, 2015

(30) Foreign Application Priority Data

Mar. 19, 2014  (TW) .............. 103110321 A

(51) Int. Cl.
*G06K 9/00*    (2006.01)
*H04N 9/64*    (2006.01)
*G06T 7/40*    (2006.01)
*G06K 9/46*    (2006.01)
*G06K 9/52*    (2006.01)

(52) U.S. Cl.
CPC .............. *H04N 9/646* (2013.01); *G06K 9/4652* (2013.01); *G06K 9/52* (2013.01); *G06T 7/408* (2013.01)

(58) Field of Classification Search
USPC .......... 382/167, 162, 163, 168, 103, 274, 280, 382/300; 348/E5.031, E9.01, 222.1, 231.3, 348/208.14, 241, 242, 273; 358/525; 375/260, 267; 455/500; 702/86, 104
See application file for complete search history.

(56) References Cited

U.S. PATENT DOCUMENTS

| | | | |
|---|---|---|---|
| 7,079,705 B2 * | 7/2006 | Zhang et al. ................ | 382/280 |
| 7,586,521 B2 | 9/2009 | Wong | |
| 8,411,943 B2 | 4/2013 | Ovsiannikov et al. | |
| 8,817,120 B2 * | 8/2014 | Silverstein et al. ........ | 348/220.1 |
| 8,917,336 B2 * | 12/2014 | Cote et al. .................. | 348/241 |
| 8,953,882 B2 * | 2/2015 | Lim et al. ................... | 382/168 |
| 9,013,611 B1 * | 4/2015 | Szedo et al. ................ | 348/242 |
| 9,014,504 B2 * | 4/2015 | Lim et al. ................... | 382/274 |
| 9,025,867 B2 * | 5/2015 | Cote et al. .................. | 382/162 |
| 9,031,319 B2 * | 5/2015 | Cote et al. .................. | 382/167 |
| 2012/0133765 A1 | 5/2012 | Matherson et al. | |

* cited by examiner

*Primary Examiner* — Anh Do
(74) *Attorney, Agent, or Firm* — Winston Hsu; Scott Margo

(57) ABSTRACT

An image sensing apparatus, a color-correction matrix correcting method and a look-up table establishing method are provided. The image sensing apparatus calculates a block statistics value corresponding to a block of pixels in an image sensor array. Based on a look-up table, the image sensing apparatus determines a covariance value corresponding to a current gain value. According to the covariance value and the block statistics value, the image sensing apparatus corrects a color-correction matrix corresponding to the block of pixels. The image sensing apparatus can use an amended color-correction matrix to correct the color of the pixel, so as to reduce chroma noise or other noise.

36 Claims, 3 Drawing Sheets

IMAGE SENSING APPARATUS AND COLOR-CORRECTION MATRIX CORRECTING METHOD AND LOOK-UP TABLE ESTABLISHING METHOD

CROSS-REFERENCE TO RELATED APPLICATION

This application claims the priority benefit of Taiwan application serial no. 103110321, filed on Mar. 19, 2014. The entirety of the above-mentioned patent application is hereby incorporated by reference herein and made a part of this specification.

FIELD OF THE INVENTION

The invention is directed to an image sensing apparatus and more particularly, to an image sensing apparatus, a color-correction matrix correcting method and a look-up table establishing method.

DESCRIPTION OF RELATED ART

An image sensing apparatus can capture image frames by using an image sensor array and gain the image frames by using a gain circuit. While the gain circuit gains an image frame, a component taken by noise of the image frame may be enlarged. A conventional image sensing apparatus suppresses the noise by using a previously established fixed color-correction matrix. However, different gains generally lead to different noise components, and different positions of the image sensor array may cause different amount of noise. As a result, suppressing the noise by using the fixed color-correction matrix brings the conventional image sensing apparatus with a poor effect.

SUMMARY

The invention provides an image sensing apparatus and a color-correction matrix correcting method thereof, in which the color-correction matrix corresponding to a block of pixels can be dynamically corrected according to a covariance value and a block statistics value.

The invention provides a look-up table establishing method to provide a covariance value.

According to an embodiment of the invention, a color-correction matrix correcting method is provided, which includes the following steps. A block statistics value corresponding to a block of pixels in an image sensor array is calculated. A covariance value corresponding to a current gain value is determined based on a look-up table. A color-correction matrix corresponding to the block of pixels is corrected according to the covariance value and the block statistics value.

According to an embodiment of the invention, an image sensing apparatus is provided. The image sensing apparatus includes an image sensing circuit, an automatic white balance unit and a color-correction unit. The image sensing circuit gains an original image frame by using a current gain value and outputs a gained image frame. The automatic white balance unit has an input terminal coupled to an output terminal of the image sensing circuit to receive the gained image frame. The automatic white balance unit outputs an adjusted image frame. The color-correction unit has an input terminal coupled to the output terminal of the automatic white balance unit to receive the adjusted image frame. The color-correction unit calculates a block statistics value corresponding to a block of pixels in an image sensor array of the image sensing circuit according to the adjusted image frame, determines a covariance value corresponding to the current gain value based on a look-up table and corrects a color-correction matrix corresponding to the block of pixels according to the covariance value and the block statistics value.

According to an embodiment of the invention, a look-up table establishing method is provided, which includes the following steps. An image frame is obtained by an image sensor array according to at least one sampling gain value during a correction period. At least one sampling block is selected from the image frame. Statistics of the at least one sampling block is calculated for the image frame. The look-up table is established according to the statistics corresponding to the sampling gain value.

To sum up, in the image sensing apparatus and the color-correction matrix correcting method provided by the embodiments of the invention, the covariance value corresponding to the current gain value can be obtained quickly based on the look-up table. On the other hand, the block statistics value corresponding to the pixel block of the current pixels can be calculated, and according to the covariance value and the block statistics value, the color-correction matrix corresponding to the pixel block of the current pixels can be corrected. According to the embodiments of the invention, a look-up table establishing method is also provided, by which the covariance value can be provided.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
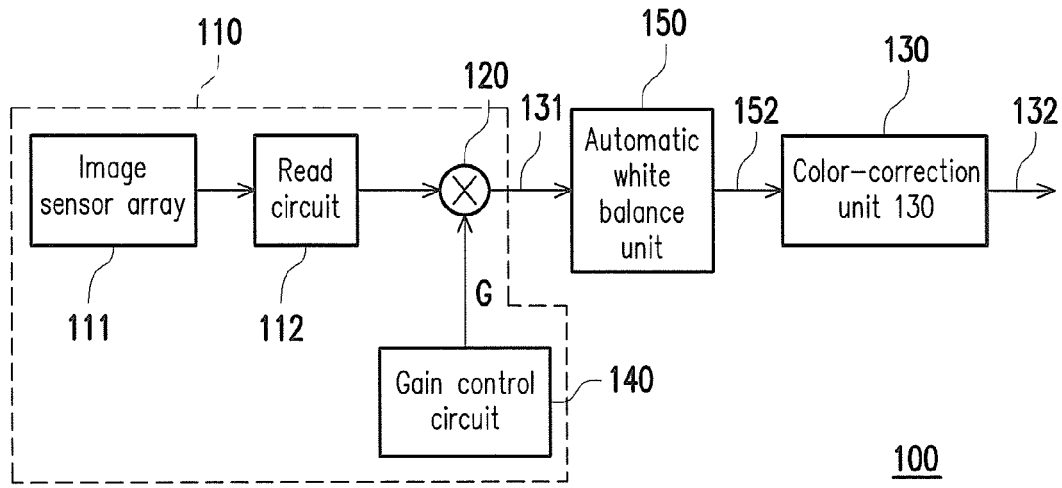
FIG. 1 is a schematic circuit block diagram illustrating an image sensing apparatus according to an embodiment of the invention.

The term "coupled" herein (including the claims) are used broadly and encompass direct and indirect connection or coupling means. For example, if the disclosure describes a first apparatus being coupled to a second apparatus, then the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/notations with the same reference numerals in different embodiments may be referenced to the related description.

FIG. 1 is a schematic circuit block diagram illustrating an image sensing apparatus 100 according to an embodiment of the invention. The image sensing apparatus 100 includes an image sensing circuit 110, a color-correction unit 130, an automatic white balance unit 150 and a gain control circuit 140. The image sensing circuit 110 gains an original image frame by using a current gain value G and outputs a gained image frame 131. The automatic white balance unit 150 has an input terminal coupled to an output terminal of the image sensing circuit 110 to receive the gained image frame 131. The automatic white balance unit 150 may perform image analyzing (e.g., color temperature judgment or other image processing) on the gained image frame 131, so as to adjust the gained image frame 131 according to an analysis result of the image analyzing and output an adjusted image frame 152 to the color-correction unit 130. The present embodiment is not intended to limit the implementation of the automatic white balance unit. For example, in some embodiments, the automatic white balance unit 150 may include a conventional automatic white balance circuit.

In the present embodiment, the image sensing circuit 110 includes an image sensor array 111, a gain control circuit 140, a gain circuit 120 and a read circuit 112. The read circuit 112 is coupled to the image sensor array 111 to read a sensing result of the image sensor array 111 and correspondingly output the original image frame to the gain circuit 120. An input terminal of the gain circuit 120 is coupled to an output terminal of the read circuit 112 to receive the original image frame 131. The gain circuit 120 gains the output from the read circuit 112 by using the current gain value G and outputs the gained image frame 131 to the automatic white balance unit 150. An input terminal of the color-correction unit 130 is coupled to an output terminal of the automatic white balance unit 150 to receive the adjusted image frame 152 that is white balanced.

During a correction period, the gain control circuit 140 may adjust the current gain value G to different gain levels as sampling gain values. Thus, the color-correction unit 130 may obtain a plurality of image frames from the image sensor array 111 by using different sampling gain values during a correction period, select at least one sampling block from each of the image frames which are gained by using the different gain values, calculates statistics of the at least one sampling block for each of the image frames and establishes the look-up table according to the statistics corresponding to the different sampling gain values. After the correction period is ended, the look-up table may be used in a color-correction operation during a normal operation period.

Figure 2:
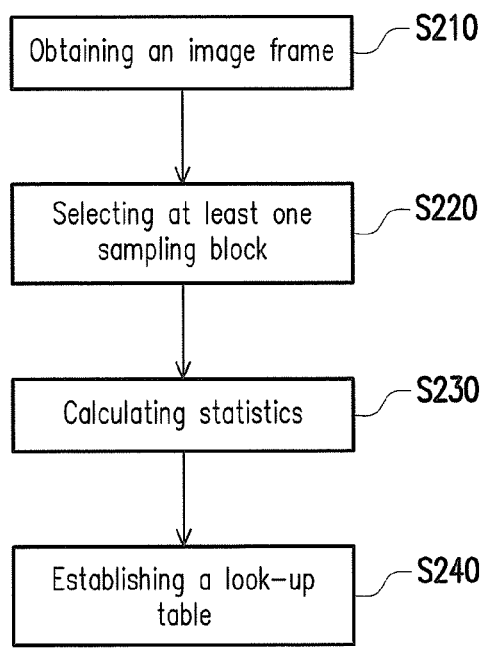
FIG. 2 is a schematic flowchart of a look-up table method according to an embodiment of the invention.

For example, FIG. 2 is a schematic flowchart of a look-up table method according to an embodiment of the invention. Referring to FIG. 1 and FIG. 2, the image sensing apparatus 100 is given various types of image parameters. For example, an exposure time may be set as 1/30 second. During the correction period, the current gain value G may be set at different gain levels as sampling gain values. In this case, it is assumed that the current gain value G is set at an $m^{th}$ gain level $G_m$.

Thus, the color-correction unit 130 may obtain an image frame from the image sensor array 111 by using the gain value Gm during the correction period (step S210). After the image is obtained, the color-correction unit 130 may select at least one sampling block from the image frame (step S220). In step S220, one or more sampling blocks may be selected from the image frame by applying any means.

Figure 3:
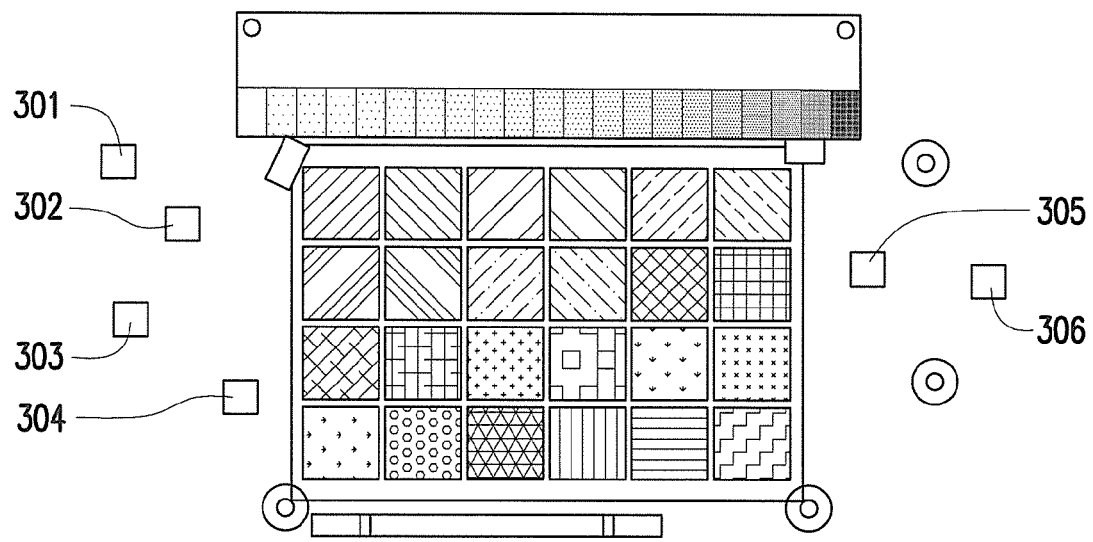
FIG. 3 is a schematic diagram illustrating an image frame captured and obtained by the image sensing apparatus using the image sensor array during a correction period according to an embodiment of the invention.

For example, FIG. 3 is a schematic diagram illustrating an image frame captured and obtained from the image sensing apparatus 100 by using the image sensor array 111 during the correction period according to an embodiment of the invention. In FIG. 3, the image frame includes a standard color chart; however, in other embodiments, the captured image frame in step S210 should not be limited thereto. The standard color chart shown in FIG. 3 has a plurality of standard colors (where different standard colors are represented by using different shading patterns). In step S210, the color-correction unit 130 may obtain the image frame shown in FIG. 3 from the image sensor array 111 by using the gain value Gm during the correction period. After the image frame is obtained, in step S220, the color-correction unit 130 may select one or more blocks (e.g., color blocks 301, 302, 303, 304, 305 and 306 shown in FIG. 3) from a planar region of the image frame illustrated in FIG. 3 as the at least one sampling block.

Figure 4:
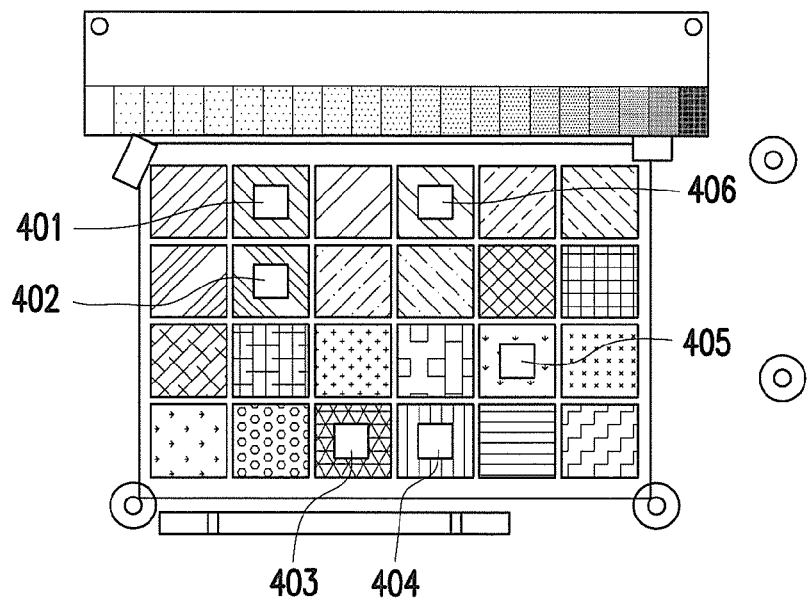
FIG. 4 is a schematic diagram illustrating an image frame captured and obtained by the image sensing apparatus using the image sensor array during a correction period according to another embodiment of the invention.

Additionally, for example, FIG. 4 is a schematic diagram illustrating an image frame captured and obtained from the image sensor array 111 by the image sensing apparatus 100 during the correction period according to another embodiment of the invention. In FIG. 4, the image frame includes a standard color chart, and the standard color chart shown in FIG. 4 has a plurality of standard colors (where different standard colors are represented by using different shading patterns). In step S210, the color-correction unit 130 may obtain the image frame shown in FIG. 4 from the image sensor array 111 by using the gain value Gm during the correction period. After the image frame is obtained, in step S220, the color-correction unit 130 may select one or more blocks (e.g., color blocks 401, 402, 403, 404, 405 and 406 from a plurality of standard color blocks shown in FIG. 4) from a planar region having specific chroma of the image frame illustrated in FIG. 4 as the at least one sampling block.

In other embodiments, in step S220, one or more sampling blocks may be selected from the image frame by applying any means. For example, in step S220, one or more sampling blocks may be selected from the image frame by combining the selection means illustrated in both FIG. 3 and FIG. 4.

Referring to FIG. 1 and FIG. 2, in step S230, the color-correction unit 130 may calculate statistics of the sampling blocks (e.g., the color blocks 301 through 306 in FIG. 3 or the color blocks 401 through 406 in FIG. 4) for the image frame so as to calculate channel noise characteristics of a red-color R, a green-color G and a blue-color B under different conditions of the gain value G of the image sensor array 111. For example, but not limited to, the color-correction unit 130 may calculate Equation 1 in step S230.

$$CorNN_j = \begin{bmatrix} \frac{1}{t}\sum_{i=1}^{t}(R_i - p_r)^2 & \frac{1}{t}\sum_{i=1}^{t}(R_i - p_r)(G_i - p_g) & \frac{1}{t}\sum_{i=1}^{t}(R_i - p_r)(B_i - p_b) \\ \frac{1}{t}\sum_{i=1}^{t}(R_i - p_r)(G_i - p_g) & \frac{1}{t}\sum_{i=1}^{t}(G_i - p_g)^2 & \frac{1}{t}\sum_{i=1}^{t}(G_i - p_g)(B_i - p_b) \\ \frac{1}{t}\sum_{i=1}^{t}(R_i - p_r)(B_i - p_b) & \frac{1}{t}\sum_{i=1}^{t}(G_i - p_g)(B_i - p_b) & \frac{1}{t}\sum_{i=1}^{t}(B_i - p_b)^2 \end{bmatrix} \quad \text{Equation 1}$$

Therein, $CorNN_j$ represents statistics of a $j^{th}$ sampling block among the sampling blocks (e.g., the color blocks 301 through 306 in FIG. 3 or the color blocks 401 through 406 in FIG. 4), t represents a number of pixels in the $j^{th}$ sampling block, $R_i$ represents a red-color sensing value (i.e., a red-color subpixel value) of an $i^{th}$ pixel in the $j^{th}$ sampling block, $P_r$ represents a parameter corresponding to the red-color sensing value in the $j^{th}$ sampling block, such as a mean or a middle value of red-color sensing values of different pixels in the $j^{th}$ sampling block, $G_i$ represents a green-color sensing value (i.e., a green-color subpixel value) of the $i^{th}$ pixel in the $j^{th}$ sampling block, and $P_g$ represents a parameter corresponding to the green-color sensing value in the $j^{th}$ sampling block, such as a mean or a middle value of green-color sensing values of different pixels in the $j^{th}$ sampling block, $B_i$ represents a blue-color sensing value (i.e., a blue-color subpixel value) of the $i^{th}$ pixel in the $j^{th}$ sampling block, and $P_b$ represents a parameter corresponding to the blue-color sensing value in the $j^{th}$ sampling block, such as a mean or a middle value of blue-color sensing values of different pixels in the $j^{th}$ sampling block.

After step S230, the color-correction unit 130 may obtain noise statistics (e.g., the matrix expressed by Equation 1) of the image sensor array 111 under different conditions of the gain value G. In step S240, the color-correction unit 130 may establish a look-up table according to the statistics corresponding to the different sampling gain values. After the correction period is ended, the look-up table may be used in a color-correction operation during a normal operation period.

For example, in step S240, the color-correction unit 130 may calculate a mean value (or a weighted mean value) of the statistics of the sampling blocks. For example, but not limited to, the color-correction unit 130 may calculate Equation 2 in step S240 to calculate a covariance matrix CorNN under the current condition of the gain value G.

$$CorNN = \frac{1}{s}\sum_{j=1}^{s}(W_j * CorNN_j) \qquad \text{Equation 2}$$

In Equation 2, CorNN represents the covariance matrix of the image sensor array 111 under the current condition of the gain value G, s represents a number of sampling blocks obtained from the image frame in step S210, $W_j$ represents a weight corresponding to the $j^{th}$ sampling block among the sampling blocks (e.g., the color blocks 301 through 306 in FIG. 3 or the color blocks 401 through 406 in FIG. 4) of the image frame, and $CorNN_j$ represents the statistics of the $j^{th}$ sampling block of the image frame. Taking the image frame shown in FIG. 4 for example, if it is assumed that statistics of the color blocks 401 through 406 are $CorNN_1$, $CorNN_2$, $CorNN_3$, $CorNN_4$, $CorNN_5$ and $CorNN_6$, respectively, and weights corresponding to the color blocks 401 through 406 are $W_1$, $W_2$, $W_3$, $W_4$, $W_5$ and $W_6$, the covariance matrix CorNN is calculated by $W_1*CorNN_1+W_2*CorNN_2+W_3*CorNN_3+W_4*CorNN_4+W_5*CorNN_5+W_6*CorNN_6)/6$ under the current condition of the gain value G.

In step S240, the color-correction unit 130 may record the calculated mean values (or the calculated weighted mean values) in the look-up table to serve the values as the covariance values corresponding to different sampling gain values. For example, the look-up table may include a plurality of covariance matrices CorNN, and the covariance matrices CorNN respectively corresponding to different gain values. If the current gain value G is $G_1$, the covariance matrix $$CorNN \text{ is } \begin{bmatrix} P1 & P2 & P3 \\ P2 & P4 & P5 \\ P3 & P5 & P6 \end{bmatrix},$$

and when the current gain value G is $G_2$, the covariance matrix $$CorNN \text{ is } \begin{bmatrix} P7 & P8 & P9 \\ P8 & P10 & P11 \\ P9 & P11 & P12 \end{bmatrix}.$$

Accordingly, the covariance matrices CorNN corresponding to different gain values may be recorded in a look-up table shown in Table 1 below.

TABLE 1

An implementation example of the look-up table

| Gain value G | Covariance Matrix CorNN | | | | | |
|---|---|---|---|---|---|---|
| $G_1$ | P1 | P2 | P3 | P4 | P5 | P6 |
| $G_2$ | P7 | P8 | P9 | P10 | P11 | P12 |
| ... | ... | ... | ... | ... | ... | ... |

Thus, the image sensing apparatus 100 may correct the image sensor array 111 in advance. Based on different gain values G of the image sensor array 111, the color-correction unit 130 may calculate a correlation matrix of each of the red-color R, the green-color G and the blue-color B channel noise. The color-correction unit 130 may establish a look-up table according to the statistics corresponding to different sampling gain values. After the correction period is ended, the look-up table may be used in the color-correction operation performed during the normal operation period.

Figure 5:
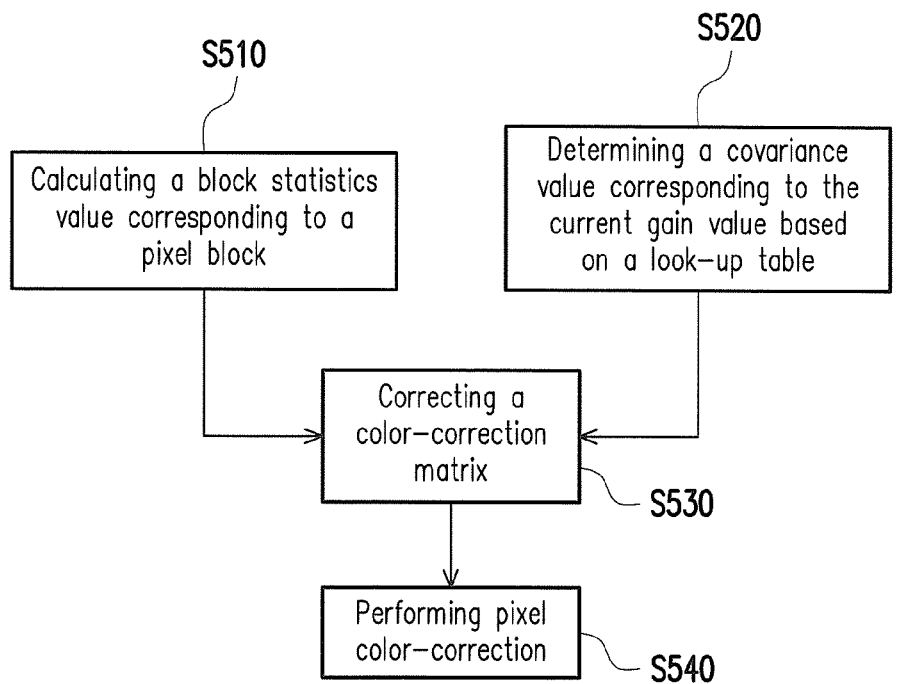
FIG. 5 is a schematic flowchart of a method for operating color-correction according to an embodiment of the invention.
Figure 6:
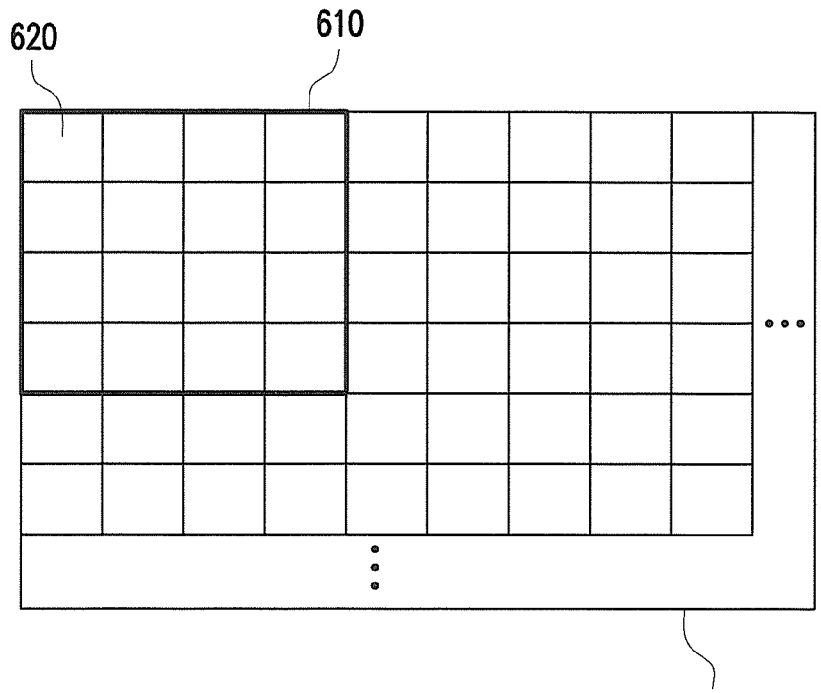
FIG. 6 is a schematic diagram of a block of pixels.

FIG. 5 is a schematic flowchart of a method for operating color-correction according to an embodiment of the invention. Referring to FIG. 1 and FIG. 5, in step S510, the color-correction unit 130 may divide the image frame captured by the image sensor array 111 into a plurality of pixel blocks and determine which pixel block a current pixel belongs to. A size of the pixel block may be determined based on design requirements. FIG. 6 is a schematic diagram of a block of pixels according to an embodiment of the invention. Further referring to FIG. 6, the image sensor array 111 includes a plurality of pixels, e.g., a pixel 620. In step S510, the color-correction unit 130 may divide the image frame captured by the image sensor array 111 into a plurality of pixel blocks, e.g., a pixel block 610. In the present embodiment, a size of the pixel block 610 is 4*4 pixels, which should not construe any limitations to other embodiments. In step S510, the color-correction unit 130 may determine a pixel block of a current pixel. For example, the color-correction unit 130 may determine a pixel block of the current pixel according to an index of the pixel 620.

Referring to FIG. 1 and FIG. 5, the color-correction unit 130 may further calculate a block statistics value corresponding to a pixel block in the image sensor array 111 in step S510. For example, in step S510, the color-correction unit 130 may calculate a correlation matrix of a current pixel block (e.g., the pixel block 610 shown in FIG. 6) to serve the correlation matrix as a block statistics value of the current pixel block. In the present embodiment, the block statistics value may be calculated by any means. For example, the color-correction unit 130 may calculate Equation 3 to obtain a correlation matrix Cor (i.e., the block statistics value).

$$Cor = \begin{bmatrix} \frac{1}{t}\sum_{i=1}^{t} R_i^2 & \frac{1}{t}\sum_{i=1}^{t} R_i*G_i & \frac{1}{t}\sum_{i=1}^{t} R_i*B_i \\ \frac{1}{t}\sum_{i=1}^{t} R_i*G_i & \frac{1}{t}\sum_{i=1}^{t} G_i^2 & \frac{1}{t}\sum_{i=1}^{t} G_i*B_i \\ \frac{1}{t}\sum_{i=1}^{t} R_i*B_i & \frac{1}{t}\sum_{i=1}^{t} G_i*B_i & \frac{1}{t}\sum_{i=1}^{t} B_i^2 \end{bmatrix} \quad \text{Equation 3}$$

Therein, t represents a number of pixels in the pixel block, $R_i$ represents a red-color sensing value (i.e., a red-color subpixel value) of an $i^{th}$ pixel in the pixel block, $G_i$ represents a green-color sensing value (i.e., a green-color subpixel value) of the $i^{th}$ pixel in the pixel block, and $B_i$ represents a blue-color sensing value (i.e., a blue-color subpixel value) of the $i^{th}$ pixel in the pixel block.

In step S520, the color-correction unit 130 may determine a covariance value corresponding to the current gain value G based on a previously established look-up table. For example, the color-correction unit 130 may find at least one covariance matrix (e.g., the covariance matrix CorNN expressed by Equation 2) from the look-up table (e.g., the look-up table shown in Table 1) based on the current gain value G in step S520. Based on the at least one covariance matrix, the color-correction unit 130 may obtain the covariance value in step S520. In some embodiments, the color-correction unit 130 may serve the at least one covariance matrix CorNN as the covariance value.

In some other embodiments, when the color-correction unit 130 is incapable of finding the corresponding covariance value in the look-up table according to the current gain value G, the color-correction unit 130 may perform an interpolation operation by using a plurality of covariance matrices CorNN that are found according to the look-up table to obtain the covariance value. In yet other embodiments, when the current gain value G is less than a threshold $G_0$, or when an exposure time is less than 1/30 second, the color-correction unit 130 may serve 0

$$\left(\text{e.g.,} \begin{bmatrix} 0 & 0 & 0 \\ 0 & 0 & 0 \\ 0 & 0 & 0 \end{bmatrix}\right)$$

as the covariance value.

In step S530, the color-correction unit 130 may correct a color-correction matrix $C_{original}$ corresponding to the pixel block according to the covariance value obtained in step S520 and the block statistics value obtained in step S510. For example, in step S530, the color-correction unit 130 may calculate Equation 4 to correct the color-correction matrix $C_{original}$.

$$C_{new} = C_{original} * (Cor - CorNN^{-1})^{T} * (Cor^{-1})^{T} \quad \text{Equation 4}$$

In Equation 4, $C_{new}$ represents a corrected color-correction matrix corresponding to one pixel block, Cor represents a block statistics value (e.g., the correlation matrix which is obtained in step S510) corresponding to the pixel block, Cor represents a covariance value (e.g., the covariance matrix obtained in step S520) corresponding to the current gain value G, and $Cor^{-1}$ represents an inverse matrix of Cor, $(Cor^{-1})^{T}$ represents a transpose matrix of $Cor^{-1}$. In some embodiments, the color-correction matrix $C_{original}$ may be a fixed color-correction matrix that is obtained by means of a conventional algorithm or any other means. In some other embodiments, the color-correction matrix $C_{original}$ may be a color-correction matrix capable of being dynamically changed in response to an ambient light source characteristic. In yet other embodiments, the color-correction matrix $C_{original}$ may be a color-correction matrix capable of being dynamically changed in response to a white balance detection result of the automatic white balance unit 150.

For example, when the white balance detection result of the automatic white balance unit 150 indicates that the ambient light is daylight, the color-correction unit 130 may select a first color-correction matrix as the color-correction matrix $C_{original}$. When the white balance detection result of the automatic white balance unit 150 indicates that the ambient light is a CWF light source (with a light temperature of 4150K), the color-correction unit 130 may select a second color-correction matrix as the color-correction matrix $C_{original}$. When the white balance detection result of the automatic white balance unit 150 indicates that the ambient light is a D65 light source (with a light temperature of 6504K), the color-correction unit 130 may select a third color-correction matrix as the color-correction matrix $C_{original}$. Each of the aforementioned first, second and third color-correction matrices may be a color-correction matrix obtained by means of a conventional algorithm or any other means. Thus, the color-correction matrix $C_{original}$ is dynamically changed depending on the light-source characteristic.

Accordingly, in an actual system operation, the color-correction unit 130 may perform the interpolation operation according to the gain value G of the image sensor array 111 and by using the look-up table to obtain noise statistics information (e.g., the covariance matrix CorNN). The color-correction unit 130 may calculate/correct the color-correction matrix of each block one by one according to the covariance value (e.g., the covariance matrix CorNN) and the block statistics value (e.g., the correlation matrix Cor).

In step S540, the color-correction unit 130 may use the corrected color-correction matrix $C_{new}$ obtained in step S530 to perform pixel color-correction on the adjusted image frame 152 to reduce chroma noise or any other noise. In step S540, the pixel colors may be corrected by any means. For example, in some embodiments, the color-correction unit 130 may use the corrected color-correction matrix $C_{new}$ obtained in step S530 and a conventional algorithm to perform pixel color-correction on the adjusted image frame 152 and output a corrected image frame 132. In other embodiments, the color-correction unit 130 may calculate Equation 5 to obtain and output the corrected image frame 132.

$$\begin{bmatrix} R' \\ G' \\ B' \end{bmatrix} = C_{new} * \begin{bmatrix} R \\ G \\ B \end{bmatrix}. \quad \text{Equation 5}$$

In Equation 5, R' represents a red-color sensing value (i.e., a red-color subpixel value), G' represents a green-color sensing value (i.e., a green-color subpixel value), and B' represents a blue-color sensing value (i.e., a blue-color subpixel value) in the corrected image frame 132. R represents a red-color sensing value (i.e., a red-color subpixel value), G represents a green-color sensing value (i.e., a green-color subpixel value), and B represents a blue-color sensing value (i.e., a blue-color subpixel value) in the adjusted image frame 152.

Based on the above, the embodiments of the invention provides a look-up table establishing method (e.g., the method illustrated in FIG. 2), by which the covariance value (e.g., the covariance matrix CorNN) can be provided. In the image sensing apparatus 100 and the color-correction matrix correcting method provided by the embodiments of the invention, the covariance value (e.g., the covariance matrix CorNN) corresponding to the current gain value G can be obtained quickly based on the previously established look-up table. On the other hand, the block statistics value (e.g., the correlation matrix Cor corresponding to the pixel block of the current pixels can be calculated. According to the covariance value and the block statistics value, the color-correction matrix $C_{original}$ corresponding to the pixel block of the current pixels can be dynamically corrected to obtain the corrected color-correction matrix $C_{new}$.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A color-correction matrix correcting method adapted to an image sensing apparatus, the method comprising:
    calculating, by a color-correction circuit, a block statistics value corresponding to a block of pixels in an image sensor array;
    determining, by the color-correction circuit, a covariance value corresponding to a current gain value based on a look-up table; and
    correcting, by the color-correction circuit, a color-correction matrix corresponding to the block of pixels according to the covariance value and the block statistics value.

2. The color-correction matrix correcting method according to claim 1, wherein the step of calculating the block statistics value comprises:
    calculating a correlation matrix of the block of pixels and serving the correlation matrix as the block statistics value.

3. The color-correction matrix correcting method according to claim 2, wherein the step of calculating the correlation matrix comprises:
    calculating the correlation matrix by $$Cor = \begin{bmatrix} \frac{1}{t}\sum_{i=1}^{t}R_i^2 & \frac{1}{t}\sum_{i=1}^{t}R_i*G_i & \frac{1}{t}\sum_{i=1}^{t}R_i*B_i \\ \frac{1}{t}\sum_{i=1}^{t}R_i*G_i & \frac{1}{t}\sum_{i=1}^{t}G_i^2 & \frac{1}{t}\sum_{i=1}^{t}G_i*B_i \\ \frac{1}{t}\sum_{i=1}^{t}R_i*B_i & \frac{1}{t}\sum_{i=1}^{t}G_i*B_i & \frac{1}{t}\sum_{i=1}^{t}B_i^2 \end{bmatrix},$$

wherein, t represents a number of pixels in the pixel block, $R_i$, represents a red-color sensing value of an $i^{th}$ pixel in the block of pixels, $G_i$ represents a green-color sensing value of the $i^{th}$ pixel in the block of pixels, and $B_i$ represents a blue-color sensing value of the $i^{th}$ pixel in the block of pixels.

4. The color-correction matrix correcting method according to claim 1, wherein the step of determining the covariance value comprises:
    finding at least one covariance matrix from the look-up table according to the current gain value; and
    obtaining the covariance value according to the at least one covariance matrix.

5. The color-correction matrix correcting method according to claim 4, wherein the step of obtaining the covariance value comprises:
    serving the at least one covariance matrix as the covariance value; or
    performing an interpolation operation by using the at least one covariance matrix to obtain the covariance value.

6. The color-correction matrix correcting method according to claim 4, wherein the step of obtaining the covariance value further comprises:
    serving 0 as the covariance value when the current gain value is less than a threshold.

7. The color-correction matrix correcting method according to claim 1, wherein the look-up table comprises a plurality of covariance matrices, and the covariance matrices respectively correspond to different gain values.

8. The color-correction matrix correcting method according to claim 1, further comprising:
    obtaining, by the color-correction circuit, a plurality of image frames by the image sensor array according to different sampling gain values during a correction period;
    selecting, by the color-correction circuit, at least one sampling block from each of the image frames;
    calculating, by the color-correction circuit, statistics of the at least one sampling block for each of the image frames; and
    establishing, by the color-correction circuit, the look-up table according to the statistics corresponding to the different sampling gain values.

9. The color-correction matrix correcting method according to claim 1, further comprising:
    obtaining, by the color-correction circuit, an image frame by the image sensor array according to a sampling gain value during a correction period;
    selecting, by the color-correction circuit, at least one sampling block from the image frame;
    calculating, by the color-correction circuit, statistics of the at least one sampling block for the image frame; and
    establishing, by the color-correction circuit, the look-up table according to the statistics corresponding to the sampling gain value.

10. The color-correction matrix correcting method according to claim 9, wherein the step of selecting the at least one sampling block comprises:
    selecting at least one block from a planar region of the image frame as the at least one sampling block; or
    selecting at least one block from a planar region having specific chroma of the image frame as the at least one sampling block.

11. The color-correction matrix correcting method according to claim 9, wherein the step of calculating the statistics comprises:

calculating $$CorNN_j = \begin{bmatrix} \frac{1}{t}\sum_{i=1}^{t}(R_i - p_r)^2 & \frac{1}{t}\sum_{i=1}^{t}(R_i - p_r)(G_i - p_g) & \frac{1}{t}\sum_{i=1}^{t}(R_i - p_r)(B_i - p_b) \\ \frac{1}{t}\sum_{i=1}^{t}(R_i - p_r)(G_i - p_g) & \frac{1}{t}\sum_{i=1}^{t}(G_i - p_g)^2 & \frac{1}{t}\sum_{i=1}^{t}(G_i - p_g)(B_i - p_b) \\ \frac{1}{t}\sum_{i=1}^{t}(R_i - p_r)(B_i - p_b) & \frac{1}{t}\sum_{i=1}^{t}(G_i - p_g)(B_i - p_b) & \frac{1}{t}\sum_{i=1}^{t}(B_i - p_b)^2 \end{bmatrix},$$

wherein $CorNN_j$ represents the statistics of a $j^{th}$ sampling block among the at least one sampling block, t represents a number of pixels in the $j^{th}$ sampling block, $R_i$ represents a red-color sensing value of an $i^{th}$ pixel in the $j^{th}$ sampling block, $P_r$ represents a parameter corresponding to the red-color sensing value in the $j^{th}$ sampling block, $G_i$ represents a green-color sensing value of the $i^{th}$ pixel in the $j^{th}$ sampling block, $P_g$ represents a parameter corresponding to the green-color sensing value in the $j^{th}$ sampling block, $B_i$ represents a blue-color sensing value of the $i^{th}$ pixel in the $j^{th}$ sampling block, and $P_b$ represents a parameter corresponding to the blue-color sensing value in the $j^{th}$ sampling block.

12. The color-correction matrix correcting method according to claim 11, wherein the parameter $P_r$ is a mean or a middle value of red-color sensing values of different pixels in the $j^{th}$ sampling block, wherein the parameter $P_g$ is a mean or a middle value of green-color sensing values of different pixels in the $j^{th}$ sampling block, and wherein the parameter $P_b$ is a mean or a middle value of blue-color sensing values of different pixels in the $j^{th}$ sampling block.

13. The color-correction matrix correcting method according to claim 9, wherein the step of establishing the look-up table comprises:
calculating a mean value or a weighted mean value of the statistics of the at least one sampling block; and
recording the mean value or the weighted mean value in the look-up table to serve the mean value or the weighted mean value as the covariance value corresponding to the sampling gain value.

14. The color-correction matrix correcting method according to claim 1, wherein the step of correcting the color-correction matrix comprises:
calculating $C_{new} = C_{original} * (Cor - CorNN^{-1})^T * (Cor^{-1})^T$,
wherein $C_{new}$ represents a corrected color-correction matrix corresponding to the block of pixels, $C_{origanal}$ represents the color-correction matrix corresponding to the block of pixels, Cor represents the block statistics value corresponding to the block of pixels, CorNN represents the covariance value, $Cor^{-1}$ represents an inverse matrix of Cor, and $(Cor^{-1})^T$ represents a transpose matrix of $Cor^{-1}$.

15. The color-correction matrix correcting method according to claim 14, wherein the color-correction matrix $C_{original}$ is dependent on a light-source characteristic.

16. An image sensing apparatus, comprising:
an image sensing circuit, gaining an original image frame by using a current gain value and outputting a gained image frame;
an automatic white balance circuit, having an input terminal coupled to an output terminal of the image sensing circuit to receive the gained image frame, and outputting an adjusted image frame; and
a color-correction circuit, having an input terminal coupled to an output terminal of the automatic white balance circuit to receive the adjusted image frame, wherein the color-correction circuit calculates a block statistics value corresponding to a block of pixels in an image sensor array of the image sensing circuit according to the adjusted image frame, determines a covariance value corresponding to the current gain value based on a look-up table and corrects a color-correction matrix corresponding to the block of pixels according to the covariance value and the block statistics value.

17. The image sensing apparatus according to claim 16, wherein the color-correction circuit calculates a correlation matrix of the block of pixels and serving the correlation matrix as the block statistics value.

18. The image sensing apparatus according to claim 17, wherein the color-correction circuit calculates the correlation matrix by $$Cor = \begin{bmatrix} \frac{1}{t}\sum_{i=1}^{t}R_i^2 & \frac{1}{t}\sum_{i=1}^{t}R_i * G_i & \frac{1}{t}\sum_{i=1}^{t}R_i * B_i \\ \frac{1}{t}\sum_{i=1}^{t}R_i * G_i & \frac{1}{t}\sum_{i=1}^{t}G_i^2 & \frac{1}{t}\sum_{i=1}^{t}G_i * B_i \\ \frac{1}{t}\sum_{i=1}^{t}R_i * B_i & \frac{1}{t}\sum_{i=1}^{t}G_i * B_i & \frac{1}{t}\sum_{i=1}^{t}B_i^2 \end{bmatrix},$$

wherein t represents a number of pixels in the block of pixels, $R_i$ represents a red-color sensing value of an $i^{th}$ pixel in the block of pixels, $G_i$ represents a green-color sensing value of a $i^{th}$ pixel in the block of pixels, and $G_i$ represents a green-color sensing value of a $i^{th}$ pixel in the block of pixels.

19. The image sensing apparatus according to claim 16, wherein the color-correction circuit finds at least one covariance matrix from the look-up table according to the current gain value and obtains the covariance value according to the at least one covariance matrix.

20. The image sensing apparatus according to claim 19, wherein the color-correction circuit serves the at least one covariance matrix as the covariance value or performs interpolation by using the at least one covariance matrix to obtain the covariance value.

21. The image sensing apparatus according to claim 19, wherein the color-correction circuit serves 0 as the covariance value when the current gain value is less than a threshold.

22. The image sensing apparatus according to claim 16, wherein the look-up table comprises a plurality of covariance matrices, and the covariance matrices respectively correspond to different gain values.

23. The image sensing apparatus according to claim 16, wherein the color-correction circuit obtains a plurality of image frames by the image sensor array according to different sampling gain values during a correction period, selects at least one sampling block from each of the image frames, calculates statistics of the at least one sampling block for each of the image frames and establishes the look-up table according to the statistics corresponding to the different sampling gain values.

24. The image sensing apparatus according to claim 16, wherein the color-correction circuit obtains an image frame by the image sensor array according to a sampling gain value during a correction period, selects at least one sampling block from the image frame, calculates statistics of the at least one sampling block for the image frame and establishes the look-up table according to the statistics corresponding to the sampling gain value.

25. The image sensing apparatus according to claim 24, wherein the color-correction circuit selects at least one block from a planar region of the image frame as the at least one sampling block or selects at least one block from the planar region having specific chroma of the image frame as the at least one sampling block.

26. The image sensing apparatus according to claim 24, wherein the color-correction circuit calculates $$CorNN_j = \begin{bmatrix} \frac{1}{t}\sum_{i=1}^{t}(R_i - p_r)^2 & \frac{1}{t}\sum_{i=1}^{t}(R_i - p_r)(G_i - p_g) & \frac{1}{t}\sum_{i=1}^{t}(R_i - p_r)(B_i - p_b) \\ \frac{1}{t}\sum_{i=1}^{t}(R_i - p_r)(G_i - p_g) & \frac{1}{t}\sum_{i=1}^{t}(G_i - p_g)^2 & \frac{1}{t}\sum_{i=1}^{t}(G_i - p_g)(B_i - p_b) \\ \frac{1}{t}\sum_{i=1}^{t}(R_i - p_r)(B_i - p_b) & \frac{1}{t}\sum_{i=1}^{t}(G_i - p_g)(B_i - p_b) & \frac{1}{t}\sum_{i=1}^{t}(B_i - p_b)^2 \end{bmatrix},$$

wherein $CorNN_j$ represents the statistics of a $j^{th}$ sampling block among the at least one sampling block, t represents a number of pixels in the $j^{th}$ sampling block, $R_i$ represents a red-color sensing value of an $i^{th}$ pixel in the $j^{th}$ sampling block, $P_r$ represents a parameter corresponding to the red-color sensing value in the $j^{th}$ sampling block, $G_i$ represents a green-color sensing value of the $i^{th}$ pixel in the $j^{th}$ sampling block, $P_g$ represents a parameter corresponding to the green-color sensing value in the $j^{th}$ sampling block, $B_i$ represents a blue-color sensing value of the $i^{th}$ pixel in the $j^{th}$ sampling block, and $P_b$ represents a parameter corresponding to the blue-color sensing value in the $j^{th}$ sampling block.

27. The image sensing apparatus according to claim 26, wherein the parameter $P_r$ is a mean or a middle value of red-color sensing values of different pixels in the $j^{th}$ sampling block, the parameter $P_g$ is a mean or a middle value of green-color sensing values of different pixels in the $j^{th}$ sampling block, and the parameter $P_b$ is a mean or a middle value of blue-color sensing values of different pixels in the $j^{th}$ sampling block.

28. The image sensing apparatus according to claim 24, wherein the color-correction circuit calculates a mean value or a weighted mean value of the statistics of the at least one sampling block and records the mean value or the weighted mean value in the look-up table to serve the mean value or the weighted mean value as the covariance value corresponding to the sampling gain value.

29. The image sensing apparatus according to claim 16, wherein the color-correction circuit calculates $C_{new} = C_{original} * (Cor - CorNN^{-1})^T * (Cor^{-1})^T$,
wherein $C_{new}$ represents a corrected color-correction matrix corresponding to the block of pixels, $C_{original}$ represents the color-correction matrix corresponding to the block of pixels, Cor represents the block statistics value corresponding to the block of pixels, CorNN represents the covariance value, $Cor^{-1}$ represents an inverse matrix of Cor, and $(Cor^{-1})^T$ represents a transpose matrix of $Cor^{-1}$.

30. The image sensing apparatus according to claim 29, wherein the color-correction matrix $C_{original}$ is dependent on a light-source characteristic.

31. A look-up table establishing method adapted to an image sensing apparatus, the method comprising:
obtaining, by a color-correction circuit, an image frame by an image sensor array according to at least one sampling gain value during a correction period;
selecting, by the color-correction circuit, at least one sampling block from the image frame;
calculating, by the color-correction circuit, statistics of the at least one sampling block for the image frame; and
establishing, by the color-correction circuit, the look-up table according to the statistics corresponding to the sampling gain value.

32. The look-up table establishing method according to claim 31, wherein the look-up table comprises a plurality of covariance matrices respectively corresponding to different gain values.

33. The look-up table establishing method according to claim 31, wherein the step of selecting the at least one sampling block comprises:
selecting at least one block from a planar region of the image frame as the at least one sampling block; or
selecting at least one block from a planar region having specific chroma of the image frame as the at least one sampling block.

34. The look-up table establishing method according to claim 31, wherein the step of calculating the statistics comprises:
calculating $$CorNN_j = \begin{bmatrix} \frac{1}{t}\sum_{i=1}^{t}(R_i - p_r)^2 & \frac{1}{t}\sum_{i=1}^{t}(R_i - p_r)(G_i - p_g) & \frac{1}{t}\sum_{i=1}^{t}(R_i - p_r)(B_i - p_b) \\ \frac{1}{t}\sum_{i=1}^{t}(R_i - p_r)(G_i - p_g) & \frac{1}{t}\sum_{i=1}^{t}(G_i - p_g)^2 & \frac{1}{t}\sum_{i=1}^{t}(G_i - p_g)(B_i - p_b) \\ \frac{1}{t}\sum_{i=1}^{t}(R_i - p_r)(B_i - p_b) & \frac{1}{t}\sum_{i=1}^{t}(G_i - p_g)(B_i - p_b) & \frac{1}{t}\sum_{i=1}^{t}(B_i - p_b)^2 \end{bmatrix},$$

wherein $CorNN_j$ represents the statistics of a $j^{th}$ sampling block among the at least one sampling block, t represents a number of pixels in the $j^{th}$ sampling block, $R_i$ represents a red-color sensing value of an $i^{th}$ pixel in the $j^{th}$ sampling block, $P_r$ represents a parameter corresponding to the red-color sensing value in the $j^{th}$ sampling block, $G_i$ represents a green-color sensing value of the $i^{th}$ pixel in the $j^{th}$ sampling block, $P_g$ represents a parameter corresponding to the green-color sensing value in the $j^{th}$ sampling block, $B_i$ represents a blue-color sensing value of the $i^{th}$ pixel in the $j^{th}$ sampling block, and $P_b$ represents a parameter corresponding to the blue-color sensing value in the $j^{th}$ sampling block.

35. The look-up table establishing method according to claim 34, wherein the parameter $P_r$ is a mean or a middle value of red-color sensing values of different pixels in the $j^{th}$ sampling block, the parameter $P_g$ is a mean or a middle value of green-color sensing values of different pixels in the $j^{th}$ sampling block, and the parameter $P_b$ is a mean or a middle value of blue-color sensing values of different pixels in the $j^{th}$ sampling block.

36. The look-up table establishing method according to claim 31, wherein the step of establishing the look-up table comprises:
   calculating a mean value or a weighted mean value of the statistics of the at least one sampling block; and
   recording the mean value or the weighted mean value in the look-up table to serve the mean value or the weighted mean value as the covariance value corresponding to the sampling gain values.

* * * * *